March 14, 1967 J. MARTIN 3,308,842
CONNECTOR
Filed Sept. 10, 1965 2 Sheets-Sheet 1

Inventor
JAMES MARTIN
By Kurt Kelman
Agent

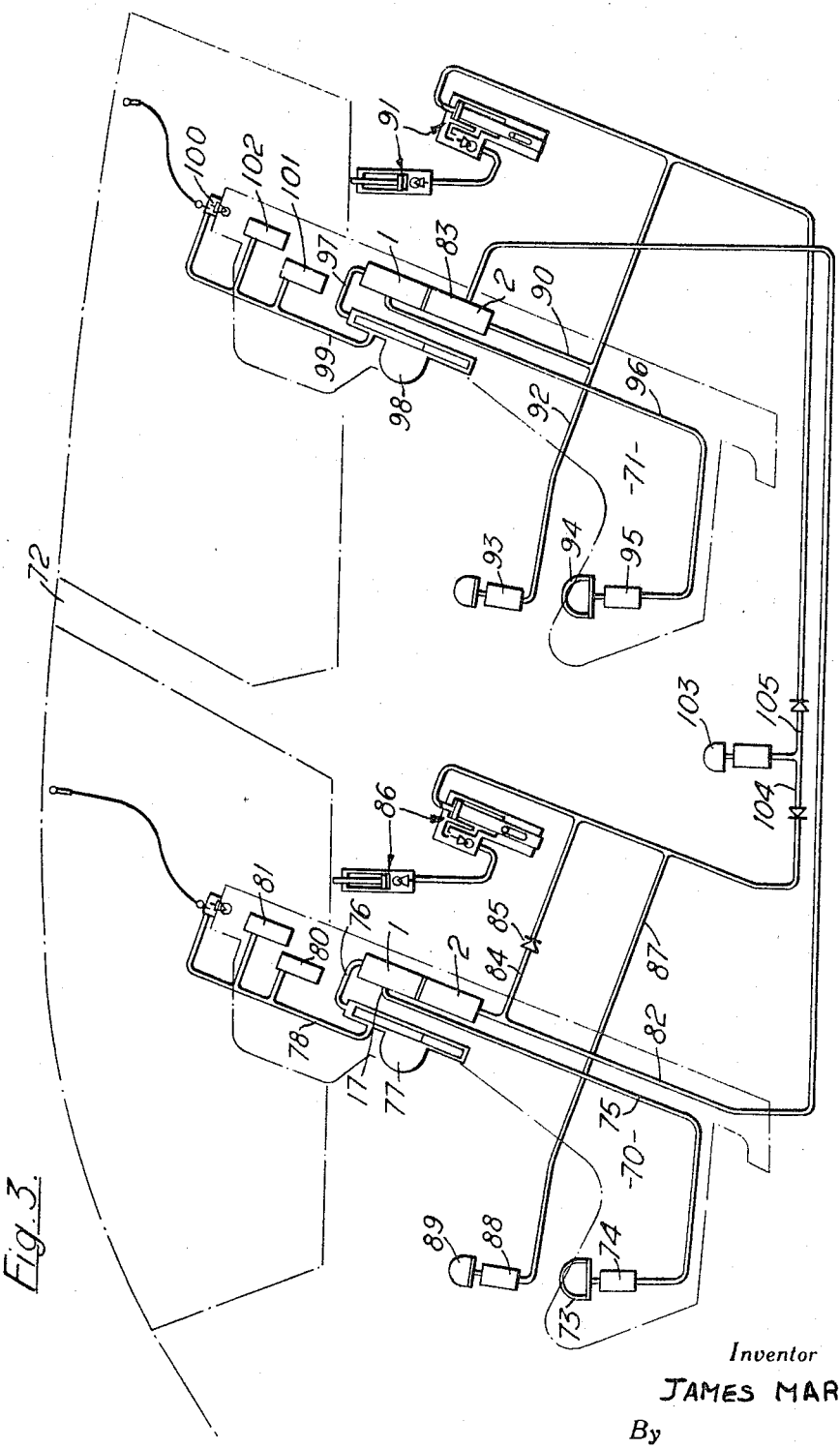

United States Patent Office 3,308,842
Patented Mar. 14, 1967

3,308,842
CONNECTOR
James Martin, Southlands Manor, Southlands Road,
Denham, near Uxbridge, England
Filed Sept. 10, 1965, Ser. No. 486,484
Claims priority, application Great Britain, Sept. 11, 1964,
37,370/64
5 Claims. (Cl. 137—68)

This invention concerns connectors and, in particular, connectors for use with aircraft ejection seats.

In a single seat aircraft provided with an ejection seat it is, of course, the occupant of such seat who initiates ejection of the seat from the aircraft but, in aircraft equipped with two or more ejection seats, experience has shown that it is desirable that the ejection of each seat should be initiated in a single operation by, for instance, the captain of the aircraft, because in present day high-speed aircraft an emergency may give rise to a situation in which no time is available for communication amongst the personnel or aircrew concerned.

Furthermore, where provision is made for the captain of the aircraft to eject the crew, provision should be made whereby such personnel other than the aircraft captain may eject themselves without also ejecting the captain of the aircraft.

A very convenient way of initiating ejection of an ejection seat from an aircraft is by the use of pressure fluid, this being especially the case where systems allowing the captain of the aircraft to eject himself and his crew are provided. It will be appreciated that certain parts of the conduits for carrying such pressure fluid will be mounted on the ejection seats of the aircraft and other parts on the aircraft itself, and one object of this invention is to provide a connector which releasably couples such two portions of conduits to one another.

According to this invention, there is provided a connector comprising first and second complementary parts adapted to be releasably secured to one another, said first part having inlet means for pressure fluid and a pressure fluid source, outlet means being provided on said first part to enable pressure fluid from said source to egress from said first part, the said second part also being provided with a pressure fluid source and outlet means for enabling the pressure fluid from said source to egress from said second part, the arrangement being such that on introduction of pressure fluid into said first part through said inlet means, pressure fluid will be released from the source in said second part.

Very conveniently said second part may be provided with inlet means so that pressure fluid entering said second part through such inlet means causes release of pressure fluid from the pressure fluid source in said first part.

Accoridng to another feature of this invention, pressure fluid entering said first part through said inlet means may also cause pressure fluid to be released from said source in said first part.

Very conveniently when said second part is provided with inlet means, pressure fluid entering such inlet means of the second part may cause pressure fluid to be released from said source in the second part in addition to releasing pressure fluid from the source in the said first part.

According to another feature of this invention, said first and second parts may each be provided with a movable piston arrangement, movement of one of said pistons causing movement of the other said piston.

Desirably the movement of one of said pistons by the other said piston may cause release of pressure fluid from the source in the part of the connector which carries the piston being moved.

Preferably the pressure fluid source in each complementary part may comprise a gas generating cartridge and, very conveniently, each said piston arrangement may consist of two pistons, one of which carries a firing pin which is adapted to engage the appropriate cartridge.

In order that the invention may be more readily understood two specific embodiments of connector will now be described by way of example and with reference to the accompanying drawings in which:

FIGURE 3 is a diagrammatic illustration of a two seat ejection arrangement showing a typical use of the preferred embodiment of connector.

Figure 1:
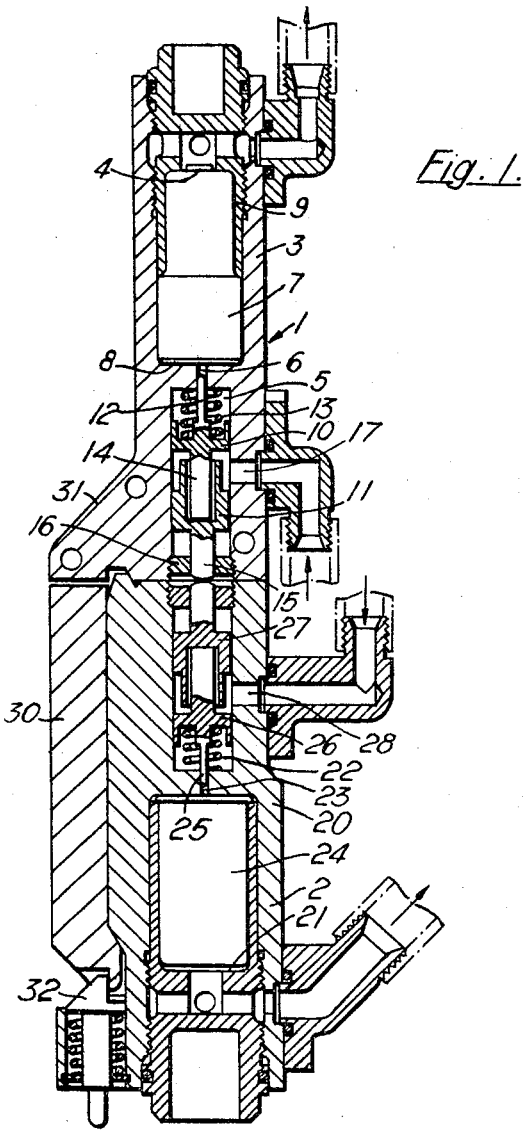
FIGURE 1 is a vertical medial sectional view of a preferred embodiment of connector in accordance with this invention.

The first and preferred embodiment of connector shown in FIGURE 1 comprises a first part 1 and a second part 2. In this particular embodiment the first part 1 is adapted to be secured to an ejection seat and the second part 2 is adapted to be secured to part of the aircraft normally housing such ejection seat.

The said first part comprises a body 3 which is provided with a central axial main bore 4 extending into the body 3 to a position approximately midway along the length thereof. The other end of the body is counterbored at 5 and said main bore 4 and the counterbore 5, which are coaxial, are connected to one another by a further axial but narrow bore 6.

The said main bore 4 houses a pressure fluid source in the form of a cylindrical gas generating cartridge 7, said cartridge 7 being secured in a position where its percussion-initiating cap 8 lies at the base of the main bore 4 adjacent said coaxial narrow bore 6 by a cylindrical collar 9 threadedly secured in said main bore 4.

The open end of said main bore constitutes means to allow ingress of pressure fluid generated by said cartridge from said first part 1.

The counterbore 5 is provided to house a piston arrangement. Such arrangement comprises two pistons 10, 11, the first of these two pistons 10 being cylindrical and carrying a firing pin 12 which is adapted to enter and ride in said coaxial narrow bore 6. A helical compression spring 13 encircles said firing pin and serves to bias said pin 12 and first piston 10 away from the percussion cap 8 and the cartridge 7.

The surface of this first piston 10 remote from the firing pin 12 carries a projection 14 which normally lies in contact with the second piston 11 which is provided with an axial recess for this purpose.

This second piston 11 carries at its end remote from the projection 14 a rod-like portion 15 which is dimensioned so that it terminates at the mouth of said counterbore 5. At the mouth of said counterbore 5 an annular guide 16 is provided which embraces the end part of the rod-like portion 15.

A transverse bore 17, which passes through the wall of the body 3 into the counterbore 5, constitutes an inlet port for pressure fluid. This inlet port enters the counterbore 5 between the two pistons 10, 11 of the piston arrangement.

The construction of the said second part 2 is very similar to that of the first part 1 insofar that it comprises a body 20 which has a main bore 21, a counterbore 22 and a narrow further bore 23 connecting the main and counterbores 21, 22. In the second part 2 the main bore 21 again houses a gas-generating cartridge 24 which is adapted to be fired by a firing pin 25 carried on one of two pistons 26, 27 positioned in the counterbore 22.

Furthermore, a transverse bore 28 is provided in the wall of the body 2 for permitting the ingress of pressure fluid into the counterbore at a position between the two said pistons 26, 27.

The said second part 2 has an external configuration such that it may be releasably interconnected to said first part 1 by means of a lever 30 pivotally connected to a bracket 31 formed integrally with, and extending outwardly from, the first part 1, said lever 30 being retained adjacent one side of the first part (when the two parts are connected to one another) by means of a spring-loaded detent 32 on said second part. The surface of the said second part carries a step-like part which, on release of the detent 32 from the lever 30 and initial separation of the first and second part, serves to cause said lever 30 to disengage the second part. For reasons to be described hereinafter said second part need not be provided with inlet means.

In the first embodiment the first and second parts are connected to one another so that the two parts 1, 2, are coaxial, but in the second embodiment the two parts hereinafter designated 40 and 42 are connected to one another in a side-by-side relationship.

Figure 2:
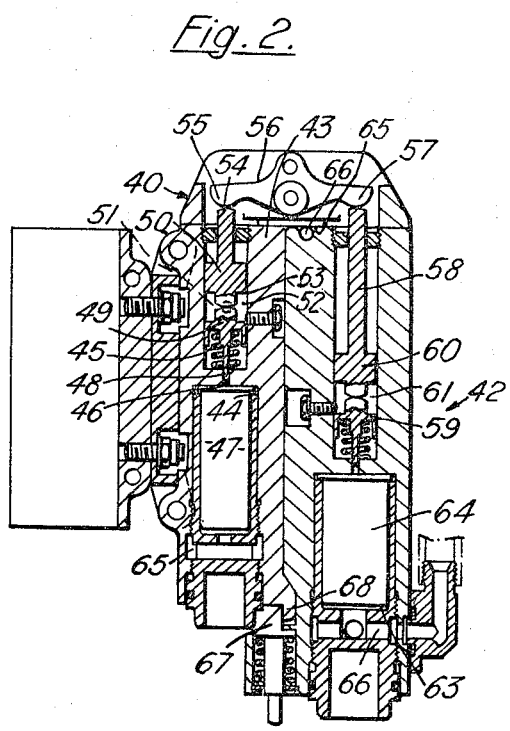
FIGURE 2 is a similar sectional view of a second embodiment of connector shown with one part thereof connected to a part of an ejection seat.

Referring now to the second embodiment shown in FIGURE 2 the first part 40 again comprises a body with a central axial main bore 44 and also a counterbore 45, the main bore 44 and the counterbore 45 being further interconnected by a further narrow bore 46. The main bore 44 is adapted to house a gas-generating cartride 47 which is adapted to be fired by a firing pin 48 on one of two pistons 49, 50 positioned in the counterbore 45.

As in the preferred embodiment, a pressure fluid inlet 51 is provided in the wall of the body at a point between the two pistons 49, 50 in the counterbore 45.

The piston 49 in the counterbore 45 carrying the firing pin 48 is provided with a domed part 52 which is adapted to engage a similarly domed part 53 on the other piston 50. The piston 50 carries a rod-like projection 54 which is adapted to engage a curved surface 55 of one end of a pivotally rockable lever 56, the other end 57 of which is adapted to engage a corresponding rod-like projection 58 carried by a second of two pistons 59, 60 provided in a counterbore 61 in the second part 42. This second part is again very similar in construction to the first part insofar that it comprises a main body having the two pistons 59, 60 in the counterbore 61 and a main bore 63 housing a gas-generating cartridge 64. The rocking lever 56 is provided to transmit movement of the piston 50 of the first part 40 to the piston 60 of the second part 42 and vice versa.

In this particular embodiment the rocking lever 56 is carried by the body 62 of the first part 40 and the second part 42 is provided with a slot 65 which is adapted to engage a pin 66 on the body of the first part 40, a spring-loaded detent 67 being provided on the second part 42 to engage a co-operating detent 68 projecting from the body of the first part 40.

Referring now to the preferred and first described embodiment of connector, it will be appreciated from the above description of this particular connector that, if pressure fluid is fed through the transverse bore 10, the piston 10 carrying the firing pin 12 will be forced to travel to the inner end of the counterbore 5 thereby forcing the firing pin 12 to travel down the narrow communicating coaxial bore 6 until it strikes the percussion initiating cap 8 of the gas-generating cartridge 7 in the main bore 4 of this first part 1. Firing of this cartridge will cause gas under pressure to be generated and this gas will pass from the main bore 4 through the open end thereof.

The pressure fluid entering the counterbore 5 between the two pistons 10, 11 will also cause the other piston 11 to move away from the piston 10 and, in consequence, the rod-like projection 15 will be forced to pass through the guide means 16 at the mouth of the counterbore 5 and this movement will force the piston 27 in the second part 2 to travel along the counterbore 22 in the second part in a direction towards the said narrow bore 23 connecting the counterbore 22 to the main bore 21.

It will be appreciated that, in view of the fact that the two pistons 26, 27 in the counterbore 22 of the second part 2 normally lie in contact with one another, the piston 26 carrying the firing pin 25 in the counterbore of the second part will be forced to strike the percussion cap of the gas-generating cartridge 24 in the main bore 21 of the second part 2 and the gas generated thereby will pass from the open end of the main bore 21 of the second part.

It will also be appreciated that should pressure fluid be introduced into the counterbore 22 of the second part 2 through the port 28 in the wall of the body thereof (embodiments where such a port is provided) the same process will take place, namely firstly the cartridge 24 in the main bore of the second part 2 will be initiated and movement of the piston 27 in the counterbore of the second part will cause appropriate movement of the two pistons 10, 11 in the counterbore of the first part, so that the cartridge in the main bore 4 of the first part 1 will be fired.

In the same way, with reference to the second embodiment of the connector, introduction of pressure fluid into the first part between the two pistons through inlet 51 will cause the first piston 49 in the counterbore of that part to fire the gas-generating cartridge 47 in the main bore thereof, and similarly, will cause the other piston 50 in the counterbore to move so that the rod-like projection 54 thereon will cause the rocking lever 56 to rock about its pivot point and to cause the rod-like projection 58 of the piston 60 in the counterbore 61 of the second part 42 to move along the counterbore and to cause the cartridge 64 in the main bore 63 of the second part to be fired, the gas generated by these two cartridges respectively being adapted to pass from the main bores of the two parts through ports 65, 66.

As has been stated above, connectors in accordance with this invention are particularly suitable for use in conjunction with aircraft ejection seats and, in particular, for use in systems for controlling the ejection of more than one ejection seat.

A typical system which is applied in an aircraft having two ejection seats 70, 71 and which utilises the preferred embodiment of connector shown in FIGURE 1 will now be described.

This typical system is applied to an aircraft having the two ejection seats 70, 71 positioned in an aircraft 72 one behind the other, the forward one of the two seats being that of the pilot or captain of the aircraft and the rear seat being that of the navigator.

The pilot's seat 70 is provided with a single handle 73 for initiating the ejection of his own seat 70 and also that of his navigator. This handle 73 is connected to a gas pressure generating arrangement 74 in the form of a cartridge, and this arrangement is connected by means of a conduit 75 to the inlet port 17 which passes through the body of the first part 1 of the connector which, in this instance, is connected to the pilot's seat 70. Another conduit 76 is connected to this first part on the pilot's seat at the mouth of the main bore 4 thereof and this conduit then passes to the inlet port of a retraction mechanism 77 on the seat, this mechanism conveniently being of the kind described and claimed in my co-pending Patent No. 3,215,376.

Such retraction mechanism 77 is provided with an outlet port to which is connected a further conduit 78 which is connected to an initiating device 79 for the firing of the ejection gun of the seat. Such conduit is also connected to a drogue gun 80, and a drogue gun time release mechanism 81.

The main bore 21 of the second part 2 which is secured to the aircraft and also to the first part of the connector on the pilot's seat 70 has a conduit 82 which travels from the mouth of the main bore 21 directly to a pressure fluid inlet port which enters the counterbore of the second part (in this case the aircraft part) of the connector 83 carried by the navigator's ejection seat. This conduit 82 connecting the second part of the pilot's connector to the second part of the navigator's connector has a branch conduit 84 leading therefrom. This branch conduit is provided with a non-return valve 85 and is coupled to a canopy unlocking and jettisoning mechanism 86 which causes firing of one or more cartridges which generate gas pressure for jettisoning the pilot's canopy.

A further conduit 87 joints the said branch conduit at a point between the non-return valve and the pilots canopy unlocking and jettisoning mechanism, and this further conduit is adapted to carry pressure fluid generated by a gas-generating cartridge housed within a unit 88 on the pilot's ejection seat, this cartridge being initiated by movement of a lever 89 on the seat. The arrangement is such that the pilot could, if he so wished, jettison his canopy without jettisoning his seat 70 or the canopy or seat of his navigator. Pressure fluid generated by the cartridge connected to this further conduit 87 is restrained from passing through the branch conduit 84 into the main bore of the second part 2 of the pilot's connector by the said non-return valve 85.

As in the arrangement used for the pilot's seat, the second part 2 of the navigator's connector 83 has a conduit 90 leading therefrom to a canopy unlocking and jettisoning mechanism 91. Connected to this latter conduit 90 is a further conduit 92 which is connected to mechanism 93, including a gas-generating cartridge, which enables the navigator to unlock and jettison his canopy without jettisoning his seat from the aircraft.

As in the case of the pilot's seat, the navigator's seat is provided with a single handle 94 for initiating the ejection of his own seat, but movement of this handle would not, of course, initiate ejection of the pilot's seat. Again, as in the case of the pilot's ejection seat, this handle 94 is connected to a gas pressure generating arrangement 95 in the form of a cartridge, and this arrangement 95 is connected by means of a conduit 96 to the inlet port which passes through the body of the first part 1 of the connector which, in this instance, is connected to the navigator's seat. Another conduit 97 is connected to this first part on the navigator's seat at the mouth of the main bore 4 thereof and this conduit 97 then passes to the inlet port of a retraction mechanism 98 of the kind described hereinbefore and with reference to the pilot's seat. A conduit 99 then leads from the outlet port of such mechanism to an initiating device 100 for the firing of the ejection gun on the navigator's seat. Such conduit may, if desired, pass through a drogue gun 101 and time release mechanism 102.

The safety regulations laid down by the appropriate authorities necessitate means being provided externally of the aircraft for removal of the canopies over the occupants of the aircraft and, to satisfy these requirements, the canopy unlocking and jettisoning mechanisms are arranged to be operated by movement of a lever 103 on the outside of the aircraft, movement of this lever 103 causing pressure fluid to be released from a pressure fluid source and to travel through conduits 104 and 105 provided with non-return valves 106, 107 which are connected to the canopy unlocking and jettisoning mechanisms.

From the above description it will have been noted that only the navigator's connector is provided with pressure fluid inlet means in the second or aircraft part thereof.

It will be appreciated from the description above that it is possible in an emergency for the pilot to eject both himself and his navigator from the aircraft with the minimum of delay merely by operating his single ejection-initiating handle 73. Movement of this handle will cause pressure fluid to pass along the conduit 75 connected thereto into the first part 1 of the pilot's connector. This pressure fluid will first cause the piston 10 in the counterbore 5 thereof, which carries the firing pin 12, to strike the percussion cap 8 of the gas-generating cartridge 7. Gas generated by this cartridge 7 will leave the main bore 4 and will enter the pilot's retraction mechanism 77. The retraction mechanism 77 will draw the pilot into his correct position in the seat for safe ejection.

After retraction of the pilot into this position the gas pressure passes on towards the initiating device for the gun of the ejection seat via conduit 78 and when provided via the drogue gun and time release mechanisms 80, 81.

During this time the pressure fluid entering the counterbore 5 of the first part of the connector on the pilot's ejection seat causes the other piston 11 therein to strike the corresponding piston in the counterbore 22 of the second part 2 of the pilot's connector. Movement of this corresponding piston 27 in the second part causes movement of the other piston 26 in the counterbore which carries the firing pin 25. Movement of this latter piston 26 causes the firing pin 25 to strike the cartridge 24 positioned in the main bore 21 of this second part and gas generated by this cartridge 24 passes to the inlet port of the second part of the navigator's connector through conduit 82. Gas generated by this cartridge also passes through the non-return valve 85 in the branch conduit 84 to the canopy unlocking and jettisoning mechanism 86.

Various delay or control valves are connected into certain of the various conduits so that the canopy will be unlocked and jettisoned and the pilot retracted and retained in his seat before the seat is ejected from the aircraft.

The gas entering the second part of the navigator's connector first causes the piston in the counterbore thereof having the firing pin, to fire the cartridge in the main bore thereof, so that pressure fluid immediately passes from the main bore to the navigator's canopy unlocking and jettisoning mechanism via conduit 90. The gas entering the counterbore of the second part of the navigator's connector causes the other piston in the counterbore to strike the corresponding piston in the counterbore of the first part. In consequence the piston in this counterbore of this first part, which carries the firing pin, causes the cartridge in the main bore of this first part to be fired and for gas under pressure to travel along the conduit 97 connected to the main bore of the first part so that the navigator's retraction mechanism 98, ejection gun initiating device 100 and where included the drogue gun 101 and time-release mechanism 102, are sequentially operated.

In operation, therefore movement of the handle by the pilot causes firstly the navigator's canopy to be unlocked and jettisoned, this jettisoning being followed by unlocking and jettisoning of the pilot's canopy. During this time both pilot and navigator are retracted into the correct position in their seats for safe ejection and, as soon as the jettisoned canopy above the pilot has cleared the ejection seat path of the navigator's seat, the navigator's seat is ejected, this ejection being rapidly followed by the ejection of the pilot's seat.

The seats, when leaving the aircraft, carry with them the first part of each of the connectors together with the conduits connected thereto, and the second part and all the remaining conduits are left in the aircraft.

With this arrangement it is not possible for the pilot of the aircraft to eject his navigator without ejecting himself but, on the other hand, in a situation where the pilot of the aircraft instructs his navigator to leave the aircraft for safety reasons the navigator can himself cause himself to be ejected by operation of the control handle 94 on his own ejection seat without also ejecting the pilot.

A static line (not shown) is connected to each of the spring-loaded detents on the second parts of the connectors, these static lines being connected to the floor or a part of the aircraft and being of such a length that on ejection of the seats from the aircraft the static line will withdraw the detents, against the action of the spring, from the co-operating part on the first part of the connector so that the two halves of each connector may separate cleanly.

Alternatively, a lever connected to this detent may be provided which is adapted to strike a part of the aircraft immediately it moves with respect to the aircraft.

From the description above it will have become apparent that connectors of this kind provide a very convenient way of transmitting forces between relatively displaceable bodies without the necessity of breaking fluid connections.

I claim:
1. A connector for coupling a plurality of pressure fluid conduits, comprising
 (1) a first connector part;
 (2) a complementary connector part;
 (3) means for releasably securing the connector parts together;
 (4) a pressure fluid inlet means in the first part connectable to one of said pressure fluid conduits for receiving pressure fluid therefrom;
 (5) a first pressure fluid source in said first connector part;
 (6) a pressure fluid outlet means in the first part connectable to another one of said pressure fluid conduits for delivering pressure fluid released from said source to the other conduit;
 (7) a second pressure fluid source in said second connector part;
 (8) another pressure fluid outlet means in the second part connectable to a third one of said pressure fluid conduits for delivering pressure fluid released from the second source to the third conduit; and
 (9) actuating means operated by the pressure fluid received from the one conduit for releasing pressure fluid from the first and the second pressure fluid sources.

2. The connector of claim 1, further comprising another pressure fluid inlet means in the second part connectable to a fourth one of said pressure fluid conduits for receiving pressure fluid therefrom, said actuating means also being operated by the pressure fluid received from the fourth conduit.

3. The connector of claim 1, wherein said actuating means includes a piston assembly in each of the connector parts, each piston assembly comprising a pair of cooperating pistons movable by the pressure fluid received, and movement of one of the pistons of one assembly causing movement of one of the pistons of the other assembly.

4. The connector of claim 3, wherein each of the pressure fluid sources is a gas generating cartridge.

5. The connector of claim 4, wherein said piston assemblies comprise a firing pin on one of the pistons of each assembly, the cartridges being arranged to be fired by a respective one of said pins.

References Cited by the Examiner

UNITED STATES PATENTS

| | | | |
|---|---|---|---|
| 3,001,541 | 9/1961 | St. Clair | 222—6 X |
| 3,043,542 | 7/1962 | Neuschotz | 137—68 X |
| 3,123,326 | 3/1964 | Kenyon | 244—122 |
| 3,180,593 | 4/1965 | Martin | 244—122 |
| 3,222,015 | 12/1965 | Larsen et al. | 244—122 |

ROBERT B. REEVES, *Primary Examiner.*

N. L. STACK, *Assistant Examiner.*